US010110342B2

(12) United States Patent
Negalaguli et al.

(10) Patent No.: US 10,110,342 B2
(45) Date of Patent: Oct. 23, 2018

(54) SYSTEM AND METHOD FOR TUNING PTT OVER LTE ACCORDING TO QOS PARAMETERS

(71) Applicant: Kodiak Networks Inc., Plano, TX (US)

(72) Inventors: Harisha Mahabaleshwara Negalaguli, Richardson, TX (US); Krishnakant M. Patel, Richardson, TX (US); Brahmananda R. Vempati, Dallas, TX (US)

(73) Assignee: KODIAK NETWORKS INC., Plano, TX (US)

( * ) Notice: Subject to any disclaimer, the term of this patent is extended or adjusted under 35 U.S.C. 154(b) by 0 days.

(21) Appl. No.: 15/286,784

(22) Filed: Oct. 6, 2016

(65) Prior Publication Data

US 2017/0099118 A1 Apr. 6, 2017

Related U.S. Application Data

(60) Provisional application No. 62/237,965, filed on Oct. 6, 2015, provisional application No. 62/273,271, filed on Dec. 30, 2015.

(51) Int. Cl.
*H04W 4/10* (2009.01)
*H04W 24/02* (2009.01)
(Continued)

(52) U.S. Cl.
CPC .......... *H04L 1/0026* (2013.01); *H04L 1/0029* (2013.01); *H04L 67/42* (2013.01);
(Continued)

(58) Field of Classification Search
CPC ..... H04W 4/10; H04W 28/24; H04W 76/005; H04W 28/0268; H04W 76/002; H04W 28/0257; H04L 65/4061
(Continued)

(56) References Cited

U.S. PATENT DOCUMENTS 3,912,874 A 10/1975 Botterell et al.
4,796,293 A 1/1989 Blinken et al.
(Continued)

FOREIGN PATENT DOCUMENTS

GB 2338150 A 3/1998
JP 200392776 A 10/2004
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.
(Continued)

*Primary Examiner* — Philip Sobutka

(57) ABSTRACT

A system and method for push-to-talk (PTT) over long-term evolution (LTE) includes a method. The method includes receiving, by a push-to-talk (PTT) server, a request from a user equipment (UE) to access the PTT server. The method further includes determining, by the PTT server, quality of service (QoS) parameters for a radio access network (RAN) connecting the UE to the PTT server. The method further includes associating, by the PTT server, the QoS parameters with a bearer between the RAN and the PTT server. The method further includes communicating, by the PTT server, with the UE according to the bearer.

24 Claims, 7 Drawing Sheets

(51) Int. Cl.
  *H04L 1/00* (2006.01)
  *H04L 29/06* (2006.01)
  *H04W 4/02* (2018.01)
  *H04W 28/02* (2009.01)
  *H04W 88/02* (2009.01)
  *H04W 84/08* (2009.01)

(52) U.S. Cl.
  CPC .............. *H04W 4/02* (2013.01); *H04W 4/10* (2013.01); *H04W 28/0284* (2013.01); *H04W 84/08* (2013.01); *H04W 88/02* (2013.01)

(58) Field of Classification Search
  USPC ................................................ 455/518–520
  See application file for complete search history.

(56) References Cited

U.S. PATENT DOCUMENTS

| | | | |
|---|---|---|---|
| 5,212,832 A | 5/1993 | Ness-Cohn | |
| 5,293,449 A | 3/1994 | Tzeng | |
| 5,353,328 A | 10/1994 | Jokimies | |
| 5,442,809 A | 8/1995 | Diaz et al. | |
| 5,546,449 A | 8/1996 | Hogan et al. | |
| 5,711,011 A | 1/1998 | Urs et al. | |
| 5,752,196 A | 5/1998 | Ahvenainen et al. | |
| 5,987,318 A | 11/1999 | Alperovich et al. | |
| 5,987,331 A | 11/1999 | Grube et al. | |
| 6,011,976 A | 1/2000 | Michaels et al. | |
| 6,021,326 A | 2/2000 | Nguyen | |
| 6,138,011 A | 10/2000 | Sanders, III et al. | |
| 6,141,556 A | 10/2000 | Dougherty et al. | |
| 6,192,119 B1 | 2/2001 | Wilson | |
| 6,304,558 B1 | 10/2001 | Mysore | |
| 6,397,054 B1 | 5/2002 | Hoirup et al. | |
| 6,405,030 B1 | 6/2002 | Suprunov | |
| 6,411,815 B1 | 6/2002 | Balasuriya | |
| 6,473,501 B1 | 10/2002 | Paulsrud | |
| 6,477,366 B1 | 11/2002 | Valentine et al. | |
| 6,477,387 B1 | 11/2002 | Jackson et al. | |
| 6,549,773 B1 | 4/2003 | Linden et al. | |
| 6,577,874 B1 | 6/2003 | Dailey | |
| 6,606,305 B1 | 8/2003 | Boyle et al. | |
| 6,628,937 B1 | 9/2003 | Salin | |
| 6,661,878 B1 | 12/2003 | Mirashrafi et al. | |
| 6,725,053 B2 | 4/2004 | Rosen et al. | |
| 6,751,468 B1 | 6/2004 | Heubel et al. | |
| 6,801,762 B1 | 10/2004 | Huilgol | |
| 6,856,676 B1 | 2/2005 | Pirot et al. | |
| 6,865,398 B2 | 3/2005 | Mangal et al. | |
| 6,892,074 B2 | 5/2005 | Tarkiainen et al. | |
| 6,895,254 B2 | 5/2005 | Dorenbosch | |
| 6,898,436 B2 | 5/2005 | Crockett et al. | |
| 6,993,355 B1 | 1/2006 | Pershan | |
| 6,996,414 B2 | 2/2006 | Vishwanathan et al. | |
| 7,026,926 B1 | 4/2006 | Walker, III | |
| 7,043,266 B2 | 6/2006 | Chaturvedi et al. | |
| 7,082,316 B2 | 7/2006 | Elden et al. | |
| 7,085,364 B1 | 8/2006 | Ahmed et al. | |
| 7,099,291 B2 | 8/2006 | Harris et al. | |
| 7,123,905 B1 | 10/2006 | Allaway et al. | |
| 7,170,863 B1 | 1/2007 | Denman et al. | |
| 7,231,225 B2 | 6/2007 | Rao et al. | |
| 7,236,580 B1 | 6/2007 | Sarkar et al. | |
| 7,330,540 B2 | 2/2008 | Darby et al. | |
| 7,366,535 B2 | 4/2008 | Glass et al. | |
| 7,403,775 B2 | 7/2008 | Patel et al. | |
| 7,460,861 B2 | 12/2008 | Zabawskj | |
| 7,529,557 B2 | 5/2009 | Farrill | |
| 7,689,238 B2 | 3/2010 | Biswas et al. | |
| 7,738,861 B2 | 6/2010 | Fournier | |
| 7,738,892 B2 | 6/2010 | Ayyasamy et al. | |
| 7,738,896 B2 | 6/2010 | Patel et al. | |
| 7,751,348 B2 | 7/2010 | Shaffer et al. | |
| 7,764,950 B2 | 7/2010 | Patel et al. | |
| 7,787,896 B2 | 8/2010 | Kundu et al. | |
| 7,797,010 B1 | 9/2010 | Manroa et al. | |
| 7,813,722 B2 | 10/2010 | Patel et al. | |
| 7,853,279 B2 | 12/2010 | Patel et al. | |
| 8,036,692 B2 | 10/2011 | Ayyasamy et al. | |
| 8,244,252 B2 | 8/2012 | Descombes | |
| 8,369,829 B2 | 2/2013 | Nagubhai et al. | |
| 8,478,261 B2 | 7/2013 | Vempati et al. | |
| 8,498,660 B2 | 7/2013 | Lawler et al. | |
| 8,670,760 B2 | 3/2014 | Lawler et al. | |
| 8,676,189 B2 | 3/2014 | Lawler et al. | |
| 8,913,494 B1 | 12/2014 | Marupaduga et al. | |
| 9,282,130 B1 | 3/2016 | Goepp et al. | |
| 2001/0005372 A1 | 6/2001 | Cave et al. | |
| 2002/0009990 A1 | 1/2002 | Kleier et al. | |
| 2002/0024943 A1 | 2/2002 | Karaul et al. | |
| 2002/0077136 A1 | 6/2002 | Maggenti et al. | |
| 2002/0086659 A1 | 7/2002 | Lauper | |
| 2002/0086676 A1 | 7/2002 | Hendrey et al. | |
| 2002/0102989 A1 | 8/2002 | Calvert et al. | |
| 2002/0187750 A1 | 12/2002 | Majumdar | |
| 2002/0196781 A1 | 12/2002 | Salovuori | |
| 2003/0009463 A1 | 1/2003 | Gallant | |
| 2003/0016632 A1 | 1/2003 | Refai et al. | |
| 2003/0017836 A1 | 1/2003 | Vishwanathan et al. | |
| 2003/0078064 A1 | 4/2003 | Chan | |
| 2003/0119540 A1 | 6/2003 | Mathis | |
| 2003/0148779 A1 | 8/2003 | Aravamudan et al. | |
| 2003/0149774 A1 | 8/2003 | McConnell et al. | |
| 2003/0153343 A1 | 8/2003 | Crockett et al. | |
| 2003/0190888 A1 | 10/2003 | Mangal et al. | |
| 2004/0032843 A1 | 2/2004 | Schaefer et al. | |
| 2004/0057449 A1 | 3/2004 | Black | |
| 2004/0067751 A1 | 4/2004 | Vandermeijden et al. | |
| 2004/0095954 A1 | 5/2004 | Varney et al. | |
| 2004/0121760 A1 | 6/2004 | Wetman et al. | |
| 2004/0127233 A1 | 7/2004 | Harris et al. | |
| 2004/0152441 A1 | 8/2004 | Wong | |
| 2004/0176100 A1 | 9/2004 | Florkey et al. | |
| 2004/0179531 A1 | 9/2004 | Bi et al. | |
| 2004/0196826 A1 | 10/2004 | Bao et al. | |
| 2004/0203793 A1 | 10/2004 | Dorenbosch | |
| 2004/0219941 A1 | 11/2004 | Haaramo et al. | |
| 2004/0224710 A1 | 11/2004 | Koskelainen et al. | |
| 2004/0228292 A1 | 11/2004 | Edwards | |
| 2004/0259580 A1 | 12/2004 | Florkey et al. | |
| 2005/0047362 A1 | 3/2005 | Harris et al. | |
| 2005/0101308 A1 | 5/2005 | Lee | |
| 2005/0111430 A1 | 5/2005 | Spear et al. | |
| 2005/0119012 A1 | 6/2005 | Merheb et al. | |
| 2005/0143135 A1 | 6/2005 | Brems et al. | |
| 2005/0164737 A1 | 7/2005 | Brown | |
| 2005/0189337 A1 | 9/2005 | Baune | |
| 2005/0192041 A1 | 9/2005 | Oxley et al. | |
| 2005/0202807 A1 | 9/2005 | Ayyasamy et al. | |
| 2005/0221819 A1 | 10/2005 | Patel et al. | |
| 2005/0232241 A1 | 10/2005 | Wu et al. | |
| 2005/0239485 A1 | 10/2005 | Kundu et al. | |
| 2005/0254464 A1 | 11/2005 | Patel et al. | |
| 2005/0255811 A1 | 11/2005 | Allen et al. | |
| 2005/0261016 A1 | 11/2005 | Patel et al. | |
| 2006/0003740 A1 | 1/2006 | Munje | |
| 2006/0003751 A1 | 1/2006 | Vo | |
| 2006/0019654 A1 | 1/2006 | Farrill | |
| 2006/0029189 A1 | 2/2006 | Patel et al. | |
| 2006/0030347 A1 | 2/2006 | Biswas | |
| 2006/0056361 A1 | 3/2006 | Jiang et al. | |
| 2006/0067499 A1 | 3/2006 | Oliveira et al. | |
| 2006/0078064 A1 | 4/2006 | Schmidt et al. | |
| 2006/0094455 A1 | 5/2006 | Hannu et al. | |
| 2006/0116150 A1 | 6/2006 | Bhutiani | |
| 2006/0128411 A1 | 6/2006 | Turcanu | |
| 2006/0178138 A1 | 8/2006 | Ostroff et al. | |
| 2006/0189337 A1 | 8/2006 | Farrill et al. | |
| 2006/0198334 A1 | 9/2006 | Civanlar et al. | |
| 2006/0229090 A1 | 10/2006 | Ladue | |
| 2006/0234687 A1 | 10/2006 | Patel et al. | |
| 2007/0037562 A1 | 2/2007 | Smith-Kerker et al. | |
| 2007/0037597 A1 | 2/2007 | Biswas et al. | |
| 2007/0037598 A1 | 2/2007 | Ayyasamy et al. | |

(56) References Cited

U.S. PATENT DOCUMENTS

| | | |
|---|---|---|
| 2007/0049314 A1 | 3/2007 | Balachandran et al. |
| 2007/0070976 A1 | 3/2007 | Mussman et al. |
| 2007/0094409 A1 | 4/2007 | Crockett et al. |
| 2007/0099609 A1 | 5/2007 | Cai |
| 2007/0133478 A1 | 6/2007 | Armbruster et al. |
| 2007/0133757 A1 | 6/2007 | Girouard et al. |
| 2007/0154005 A1 | 7/2007 | Daigle |
| 2007/0177602 A1 | 8/2007 | Pichelin et al. |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0159128 A1 | 7/2008 | Shaffer et al. |
| 2008/0299953 A1 | 12/2008 | Rao |
| 2009/0080356 A1 | 3/2009 | Song et al. |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0161590 A1 | 6/2009 | Lewis et al. |
| 2009/0209235 A1 | 8/2009 | Lawler et al. |
| 2009/0279512 A1 | 11/2009 | Fujishima |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0197335 A1 | 8/2010 | Jin et al. |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2012/0026947 A1 | 2/2012 | Miller et al. |
| 2012/0278496 A1 | 11/2012 | Hsu |
| 2013/0021933 A1 | 1/2013 | Kovvali et al. |
| 2013/0021965 A1* | 1/2013 | Chu ............... H04W 4/10 370/328 |
| 2013/0084911 A1 | 4/2013 | Chang |
| 2013/0136025 A1 | 5/2013 | Li et al. |
| 2013/0155875 A1 | 6/2013 | Ayyasamy et al. |
| 2013/0196706 A1 | 8/2013 | Patel et al. |
| 2013/0272436 A1 | 10/2013 | Makhlouf et al. |
| 2013/0315164 A1 | 11/2013 | Arur et al. |
| 2013/0337859 A1 | 12/2013 | Patel et al. |
| 2014/0056220 A1 | 2/2014 | Poitau et al. |
| 2014/0078898 A1* | 3/2014 | Anchan ............ H04W 28/0268 370/230 |
| 2014/0133443 A1 | 5/2014 | Malladi et al. |
| 2014/0148210 A1 | 5/2014 | Kundu et al. |
| 2014/0219083 A1 | 8/2014 | Mandyam et al. |
| 2014/0219255 A1 | 8/2014 | Eyuboglu et al. |
| 2014/0226746 A1 | 8/2014 | Ko et al. |
| 2014/0274080 A1 | 9/2014 | Gilbert et al. |
| 2015/0078295 A1* | 3/2015 | Mandyam ......... H04L 65/1003 370/329 |
| 2015/0085797 A1 | 3/2015 | Ji et al. |
| 2015/0092704 A1 | 4/2015 | Chen |
| 2015/0117347 A1 | 4/2015 | Iwai |
| 2015/0163039 A1 | 6/2015 | Davydov et al. |
| 2015/0173107 A1 | 6/2015 | Newberg et al. |
| 2015/0365961 A1* | 12/2015 | Strasman ......... H04L 65/1069 370/329 |
| 2016/0269945 A1* | 9/2016 | Jang ................. H04W 72/0453 |
| 2016/0277992 A1 | 9/2016 | Cao |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |
| WO | 2014169461 A1 | 10/2014 |
| WO | 2015105970 A1 | 7/2015 |

OTHER PUBLICATIONS

Nokia: "What is TETRA? Why Nokia TETRA?", The Nokia TETRA Primer, 2002, pp. 1-29.

Skype: "Skype", Web Archive—Skype, May 22, 2004, pp. 1-2, May 22, 2004, pp. 1-2.

Trachwell: "TrackWell Software and Tetra Iceland deliver value added services to Tetra users", trackwell.com, Oct. 2002, pp. 1-1.

\* cited by examiner

| Required Functionality | | Typical LTE | Typical VoIP |
|---|---|---|---|
| | RRC    IP | | |
| Security & Header Compression | PDCP | No RoHC | RoHC |
| Layer-2 Retransmissions | RLC | ACK Mode | Unacknowledged Mode |
| Scheduling & HARQ | MAC | Dynamic Scheduling | Semi-Persistent Scheduling |
| Modulation, Coding, OFDMA, and MIMO | PHY | DRx | TTI Bundling, DRx, and DTx |

*Fig. 2*

SYSTEM AND METHOD FOR TUNING PTT OVER LTE ACCORDING TO QOS PARAMETERS

CROSS-REFERENCE TO RELATED APPLICATIONS

This application claims the benefit of U.S. Provisional Application No. 62/237,965, filed on Oct. 6, 2015, and U.S. Provisional Application No. 62/273,271, filed on Dec. 30, 2015, which applications are hereby incorporated herein by reference.

TECHNICAL FIELD

The present invention relates generally to communications over a telecommunications network, and in particular embodiments, to techniques and mechanisms for push-to-talk (PTT) over long-term evolution (LTE).

BACKGROUND

PTT over cellular (PoC) platforms involve providing PoC functionality (e.g., call group management, call origination, call transmittal, talk-back call termination, floor management, filtering, etc.) through clients on client devices. The PoC functions may be performed by one or more servers, and communications between the client devices and the servers may be performed over a network.

SUMMARY

In accordance with a preferred embodiment of the present invention, a method includes: receiving, by a push-to-talk (PTT) server, a request from a user equipment (UE) to access the PTT server; determining, by the PTT server, quality of service (QoS) parameters for a radio access network (RAN) connecting the UE to the PTT server; associating, by the PTT server, the QoS parameters with a bearer between the RAN and the PTT server; and communicating, by the PTT server, with the UE according to the bearer.

In some embodiments, the method may further include establishing, by the PTT server, the bearer between the RAN and the PTT server before the associating the QoS parameters with the bearer. In some embodiments, associating the QoS parameters with the bearer includes indicating, by the PTT server, a QoS profile associated with the QoS parameters to a policy and charging rules function (PCRF) in a core network (CN), the bearer defining data flow between the RAN and the CN. In some embodiments, associating the QoS parameters with the bearer includes indicating, by the PTT server, the QoS parameters to a policy and charging enforcing function (PCEF) in a core network (CN), the bearer defining data flow between the RAN and the CN. In some embodiments, the QoS parameters include at least one of a physical layer parameter, a media access control layer parameter, a radio link control layer parameter, and a packet data convergence protocol layer parameter for the RAN. In some embodiments, the physical layer parameter indicates the RAN should use transmission time interval (TTI) bundling. In some embodiments, the media access control layer parameter indicates the RAN should use semi-persistent scheduling (SPS). In some embodiments, the media access control layer parameter indicates the RAN should use a packet delay budget (PDB) of at least 40 ms, the PDB indicating the RAN should use at least two hybrid automatic repeat request (HARQ) retries. In some embodiments, the media access control layer parameter indicates the RAN should use a packet delay budget (PDB) of at least 200 ms, the PDB indicating the RAN should increase a modulation and coding scheme (MCS) index or a transmission block size (TBS) index of the RAN. In some embodiments, the radio link control layer parameter indicates the RAN should operate in acknowledged mode (AM). In some embodiments, communicating with the UE includes transmitting, by the PTT server, IP packets to the UE, each of the IP packets including more than one media frame of PTT data. In some embodiments, the packet data convergence protocol layer parameter indicates the RAN should use robust header compression (RoHC). In some embodiments, the QoS parameters indicate a packet delay budget for the bearer between the RAN and the PTT server.

In accordance with a preferred embodiment of the present invention, a method includes: receiving, by a gateway, a request from a user equipment (UE) to access a PTT server; forwarding, by the gateway, the request from the UE to the PTT server; receiving, by the gateway, a request to associate quality of service (QoS) parameters with a bearer between the PTT server and a radio access network (RAN) connecting the UE to the PTT server; associating, by the gateway, the bearer between the RAN and the PTT server with the QoS parameters; and communicating, by the gateway, with the UE according to the bearer.

In some embodiments, the method further includes: receiving, by the gateway, a request to establish the bearer from a policy and charging rules function (PCRF) in a core network (CN), the request indicating the QoS parameters; and establishing, by the gateway, the bearer between the RAN and the CN according to the request to establish the bearer, the bearer defining data flow between the RAN and the CN. In some embodiments, the QoS parameters include at least one of a physical layer parameter, a media access control layer parameter, a radio link control layer parameter, and a packet data convergence protocol layer parameter for the RAN. In some embodiments, the physical layer parameter indicates the RAN should use transmission time interval (TTI) bundling. In some embodiments, the media access control layer parameter indicates the RAN should use semi-persistent scheduling (SPS). In some embodiments, the media access control layer parameter indicates the RAN should use a packet delay budget (PDB) of at least 40 ms, the PDB indicating the RAN should use at least two hybrid automatic repeat request (HARQ) retries. In some embodiments, the media access control layer parameter indicates the RAN should use a packet delay budget (PDB) of at least 200 ms, the PDB indicating the RAN should increase a modulation and coding scheme (MCS) index or a transmission block size (TBS) index of the RAN. or higher. In some embodiments, the radio link control layer parameter indicates the RAN should operate in acknowledged mode (AM). In some embodiments, communicating with the UE includes forwarding, by the gateway, IP packets from the PTT server to the UE, each of the IP packets including more than one media frame of PTT data. In some embodiments, the packet data convergence protocol layer parameter indicates the RAN should use robust header compression (RoHC). In some embodiments, the QoS parameters indicate a packet delay budget for the bearer between the RAN and the gateway.

In accordance with a preferred embodiment of the present invention, a push-to-talk (PTT) server includes: one or more processors; and a computer readable storage medium storing programming for execution by the one or more processors, the programming including instructions to: receive a request from a user equipment (UE) to access the PTT server; determine quality of service (QoS) parameters for a radio access network (RAN) connecting the UE to the PTT server; associate a bearer between the RAN and the PTT server with the QoS parameters; and communicate with the UE according to the bearer.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 2 is a diagram of various LTE RAN configurations.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

A system and method for tuning PTT over LTE is provided in accordance with various embodiments. In particular, a LTE radio access network (RAN) is configured to optimize or at least improve RAN configuration and resource utilization for PTT over LTE. Traffic over an LTE bearer used for PTT may be optimized or improved by tuning key QoS parameters for the bearer. In some embodiments, the packet delay budget (PDB), packet error/loss rate (PLR), and/or the like are tuned. The QoS parameters are tuned in view of various characteristics of a PTT service. For example, LTE RAN parameters that are less relevant to PTT performance may be tuned conservatively, and LTE RAN parameters that are more relevant to PTT performance may be tuned liberally. The QoS parameters may be tuned on the operator side, e.g., by a PoC platform in a communications network. The parameters are tuned so that a minimum performance metric, such as quantity of PTT users that can be accommodated within a cell, is achieved.

Although some example embodiments are described with respect to LTE, it should be appreciated that embodiment techniques could be applied in other communications networks. For example, some embodiment techniques could be applied with WiFi and the like.

Embodiments may achieve advantages. By considering the characteristics of a PTT service, LTE RAN parameters may be tuned such that the RAN resources are utilized more optimally, without significantly degrading overall service quality of PTT services. Further, by reducing the RAN resources utilized for PTT call legs, the overall quantity of PTT users that can be accommodated within a cell may be increased.

Figure 1:
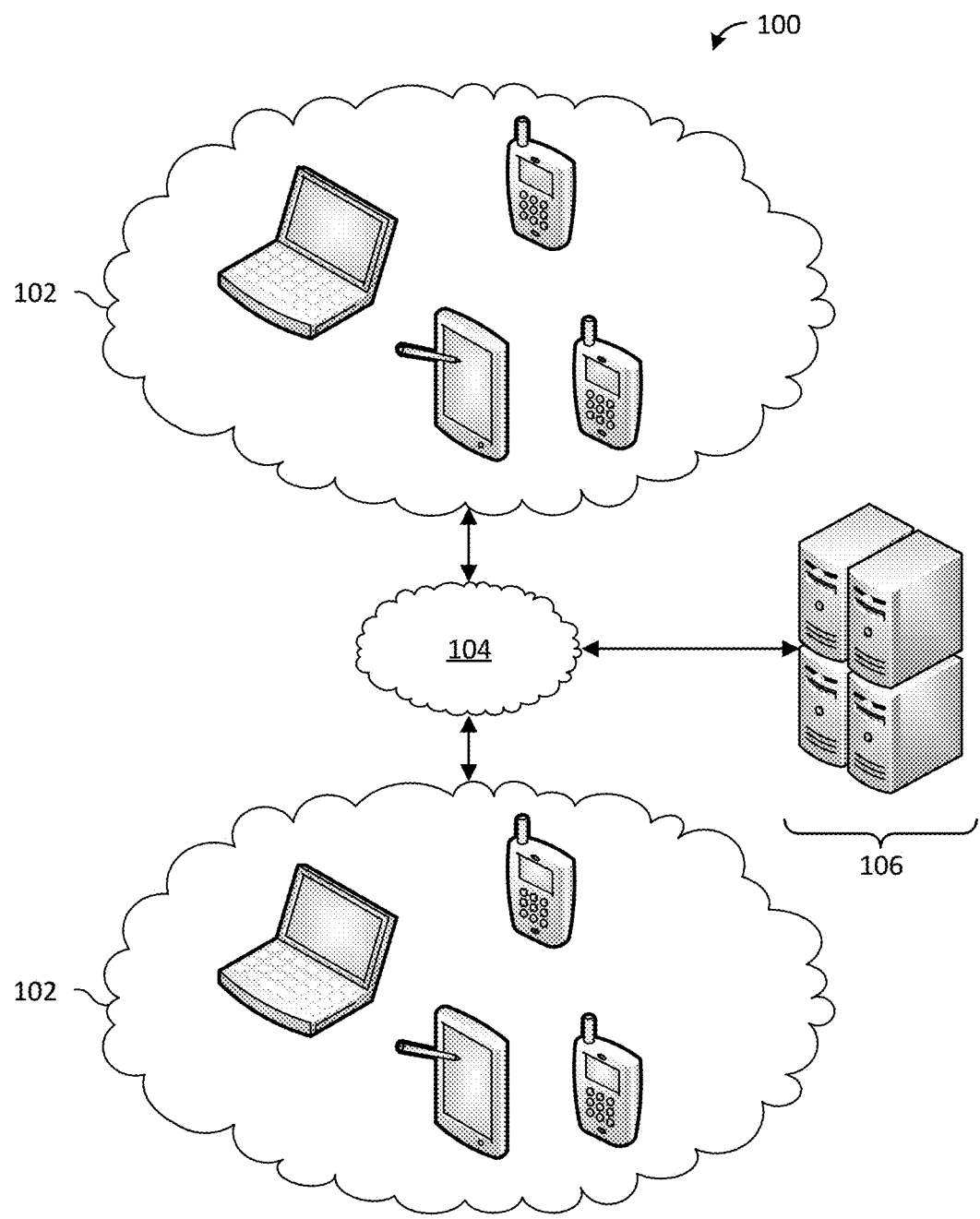
FIG. 1 is a diagram of a communications system.

FIG. 1 is a diagram of a communications system 100, which provides an architecture for supporting a telecommunications solution (e.g., a push-to-talk (PTT) communications solution) in accordance with some embodiments. Communications system 100 includes client devices 102, a communications network 104, and a telecommunications services platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "clients") reside on the client devices 102 for accessing various functions, such as PTT functions, provided by the telecommunications solution.

The client devices 102 may communicate with the telecommunications services platform 106 over the communications network 104, which may be accessed by the client devices 102 through a cellular network deployed by a carrier, a WiFi network, a RAN, other wireless networks, a wired internet protocol (IP) network, combinations thereof, or the like. The communications network 104 may include one or more components configured to provide wireless or wired network access, such as an enhanced Node B (eNB), a macro-cell, a femtocell, a Wi-Fi access point (AP), combinations thereof, or the like. Furthermore, the communications network 104 may operate in accordance with one or more wireless communication protocols, e.g., open mobile alliance (OMA), LTE, LTE advanced (LTE-A), High Speed Packet Access (HSPA), Wi-Fi 802.11a/b/g/n/ac, etc. In some embodiments, the communications network 104 may comprise various other devices, such as relays, low power nodes, etc. The communications network 104 may further include backhaul network components, such as various gateways, routers, controllers, schedulers, and the like.

In an embodiment where the telecommunications services platform 106 is a PoC platform, subscribers to a PTT solution (e.g., users operating the client devices 102) may be provisioned onto communications system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. The PTT platform may provide a plurality of PTT functions to the client devices 102 through the PTT clients on the client devices 102 as described in greater detail below.

In some embodiments, the telecommunications services platform 106 uses container technology for virtualization of a telecommunications system architecture, such as, the virtualization of provided PTT services. Example container technologies may include Docker, Rocket, LXD, and the like although the architecture is not limited to a specific container technology. Virtualization using container technology may allow the telecommunications services platform 106 to adopt a micro-services model in which service clusters are considered the building blocks of the system architecture. For example, each function provided by the telecommunications services platform 106 may be virtualized in a unique service cluster, and each service cluster may perform a different function in the telecommunications services platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the telecommunications services platform) to be independently deployed and managed. Thus, system resilience may be improved as failures are localized to individual services. Furthermore, rapid and agile deployment of services may also be achieved.

In some embodiments, the telecommunications services platform 106 incorporates distributed databases, clustering technologies, data analytics tools, and messaging middleware to provide a robust, scalable platform. The telecommunications services platform 106 may use fully virtualized components with a layered approach to service orchestration, which allows the telecommunications services platform 106 to be integrated into various cloud environments, such as a carrier's private cloud infrastructure, a dedicated PTT cloud infrastructure, combinations thereof, and the like. A more detailed description of an embodiment telecommunications services platform may be found in commonly-assigned U.S. patent application Ser. No. 14/994,757 filed on Jan. 13, 2016, entitled "System and Method for Elastic Scaling using a Container-Based Platform," which is hereby incorporated by reference. Other telecommunication services platforms, including other PTT platforms, may be used in other embodiments.

Dedicated LTE bearers are established in the communications network 104 for PTT over LTE traffic. The dedicated bearers for PTT over LTE traffic may sometimes be referred to herein as a "PTT bearers." Each LTE bearer in the communications network 104, including the PTT bearers, is associated with a QoS profile. The PTT bearers are used by a RAN to exchange PTT traffic with a core network, where the PTT traffic is for PTT users in the RAN. The QoS profile has QoS parameters that describe properties of the PTT bearers. The PTT bearer properties include, e.g., bit rates, packet delay budget (PDB), packet loss budget, bit error rate (PER), scheduling policy, and the like. Other QoS parameters include, e.g., the QoS class identifier (QCI), allocation and retention priority (ARP), guaranteed bit rate (GBR), maximum bit rate (MBR), and the like. QoS parameters tuned for PTT traffic are associated with the PTT bearers.

The communications network 104 assigns each LTE bearer a QCI that identifies QoS parameters. The QCI is a number that is used within the communications network 104 as a reference to specific parameters that control packet treatment for the bearer. As noted above, the packet delay budget is one QoS parameter associated with the QoS profile identified by the QCI. Table 6.1.7 of the 3GPP TS 23.203 standard ("Policy and Charging Control Architecture") lists some standardized QCI profiles, and is reproduced below in part for reference.

| 3GPP TS 23.203 Table 6.1.7: Standardized QCI characteristics. | | | | |
|---|---|---|---|---|
| QCI | Resource Type | PDB | PER | Example Services |
| 1 | GBR | 100 ms | $10^{-2}$ | Conversational Voice |
| 5 | Non-GBR | 100 ms | $10^{-6}$ | IMS Signaling |
| 8 | Non-GBR | 300 ms | $10^{-6}$ | Internet Traffic |
| 65 | GBR | 75 ms | $10^{-2}$ | Mission Critical user plane Push To Talk voice (e.g., MCPTT) |
| 66 | GBR | 100 ms | $10^{-2}$ | Non-Mission-Critical user plane Push To Talk voice |
| 69 | Non-GBR | 60 ms | $10^{-6}$ | Mission Critical delay sensitive signalling (e.g., MC-PTT signalling) |
| 70 | Non-GBR | 200 ms | $10^{-6}$ | Mission Critical Data (e.g. example services are the same as QCI 6/8/9). |

FIG. 2 is a diagram of various LTE RAN configurations. The protocol stack layers for LTE include the physical (PHY) layer, media access control (MAC) layer, radio link control (RLC) layer, packet data convergence protocol (PDCP) layer, radio resource control (RRC) layer, and internet protocol (IP) layer. These layers perform functions such as security and header compression, layer-2 retransmission, scheduling, hybrid automatic repeat request (HARQ), modulation, coding, orthogonal frequency-division multiple access (OFDMA), and multiple-input and multiple-output (MIMO) transmission. The RRC layer is used for control traffic such as LTE signaling, and the IP layer is used for user traffic. An LTE configuration specifies some or all of these functions. Various embodiments may call for an LTE configuration using particular modulation and coding schemes.

FIG. 2 also shows RAN configurations for example LTE traffic and for example voice over IP (VoIP) traffic. As discussed further below, a PTT bearer may not use all of the RAN configurations shown in a single column. For example, some example LTE configurations are also suitable for PTT, and other example LTE configurations are not suitable for PTT. Likewise, some example VoIP configurations are also suitable for PTT, and other example VoIP configurations are not suitable for PTT.

Some example LTE configuration use HARQ, and may make use of backward error correction (BEC) and forward error correction (FEC). In LTE, the round-trip delay for HARQ may be about 8 milliseconds (ms), and HARQ operates with an acceptable error rate of up to about 10% for each individual transmission. The quantity of HARQ retries may be configured by the communications network 104. In some embodiments, the quantity of HARQ retries may be varied based on the PDBs assigned to specific traffic types, and may be optimized for PTT. For example, the PTT bearers may be configured for two HARQ retransmits so that the MAC layer of the RAN operates at an error rate of about 1%. In some embodiments, erroneous packets may be used to help decode retransmitted packet(s). Although two HARQ retransmits results in an error rate of about 1%, which may be relatively high rate for some applications, the characteristics of PTT (discussed below) are such that an error rate of about 1% produces an acceptable perceived quality for the end users.

Because the PTT bearer operates at an error rate of about 1%, the RLC layer will perform layer-2 retransmissions for about 1-2% of packets. In LTE, RLC may be configured to operate in acknowledged mode (AM). Some example VoIP packets contain about 20 ms of voice data per packet, and each HARQ cycle takes about 8 ms, so retransmission on the RLC layer in ACK mode after two HARQ cycles would likely be too slow for a receiver to receive retransmitted voice packets in a timely manner. AM may be particularly beneficial for PTT bearers with lower orders of packet bundling (e.g., about 20 ms or 40 ms of voice per packet), or when RAN uplink capacity is limited. By using AM, the PTT server may send media IP packets containing multiple frames of data. Any packets lost in radio transmission, even after HARQ retransmission failures, may be successfully retransmitted through the use of AM. Transmitting media IP packets with more media frames may increase the overall capacity of the PTT system.

The traffic patterns of PTT over LTE have several characteristic. Group calls are common, which may require a large number of radio resources to be simultaneously used and may require significant downlink traffic compared to uplink traffic. Traffic is one-way, e.g., a particular speech direction (talker to listener(s)), and there may be a clear indication of speech direction changes (via a floor control). The end-to-end call setup time is critical, and in some embodiments may need to be less than about 500 ms. The floor request ACK time may also be critical, and in some embodiments may need to be less than about 200 ms. Calls are shorter, but more frequent, and call setup/teardown may be performed frequently. There may be fewer silence periods between speech, and participants release the floor when they are not talking.

PTT over LTE traffic has several key points of differentiation that distinguish it from ordinary LTE traffic. PTT over LTE traffic may generally be treated like real-time voice traffic, with some differences. PTT over LTE solutions may be capable of tolerating higher orders of latency than some example VoIP configurations. PTT is half-duplex traffic, e.g., only one talker speaks at a time. Unlike a traditional VoIP conversation, PTT requires a change of the floor when the current speaker changes in a PTT call. PTT can tolerate higher voice latency than some example VoIP end-to-end latency, which may be from about 200 ms to about 250 ms. As such, the max-delay-budget may be higher for a PTT call. Utilizing a higher max-delay-budget for PTT over LTE traffic allows the RAN to utilize less conservative physical modulation schemes (e.g., higher acceptable error rate), with the understanding that retransmissions with HARQ are possible.

Voice over LTE (VoLTE) is a set of specific profiles to provide voice service on LTE. RAN optimizations used for VoLTE may be capable of coexisting with some optimizations used in embodiment QoS parameters for PTT over LTE. Such optimizations may include the use of a higher priority than other IP traffic (GBR or non-GBR), the use of robust header compression (RoHC), semi-persistent scheduling, transmission time interval (TTI) bundling, and the like.

Different optimizations may have different magnitudes of impact on the performance of PTT over LTE. For example, the use of RoHC, TTI bundling, semi-persistent scheduling (SPS), and PDB tuning may have a high degree of benefit for PTT over LTE. TTI bundling may improve the reliability of PTT calls for cell edge users. Because PTT over LTE may tolerate higher latencies than VoIP, a high PDB may allow the RAN to use a less conservative modulation or coding scheme (discussed below) on the assumption that HARQ retries will be available. Conversely, the use of AM may have a lower degree of benefit for PTT over LTE, and may yield improvements when lower orders of packet bundling are used.

Figure 3:
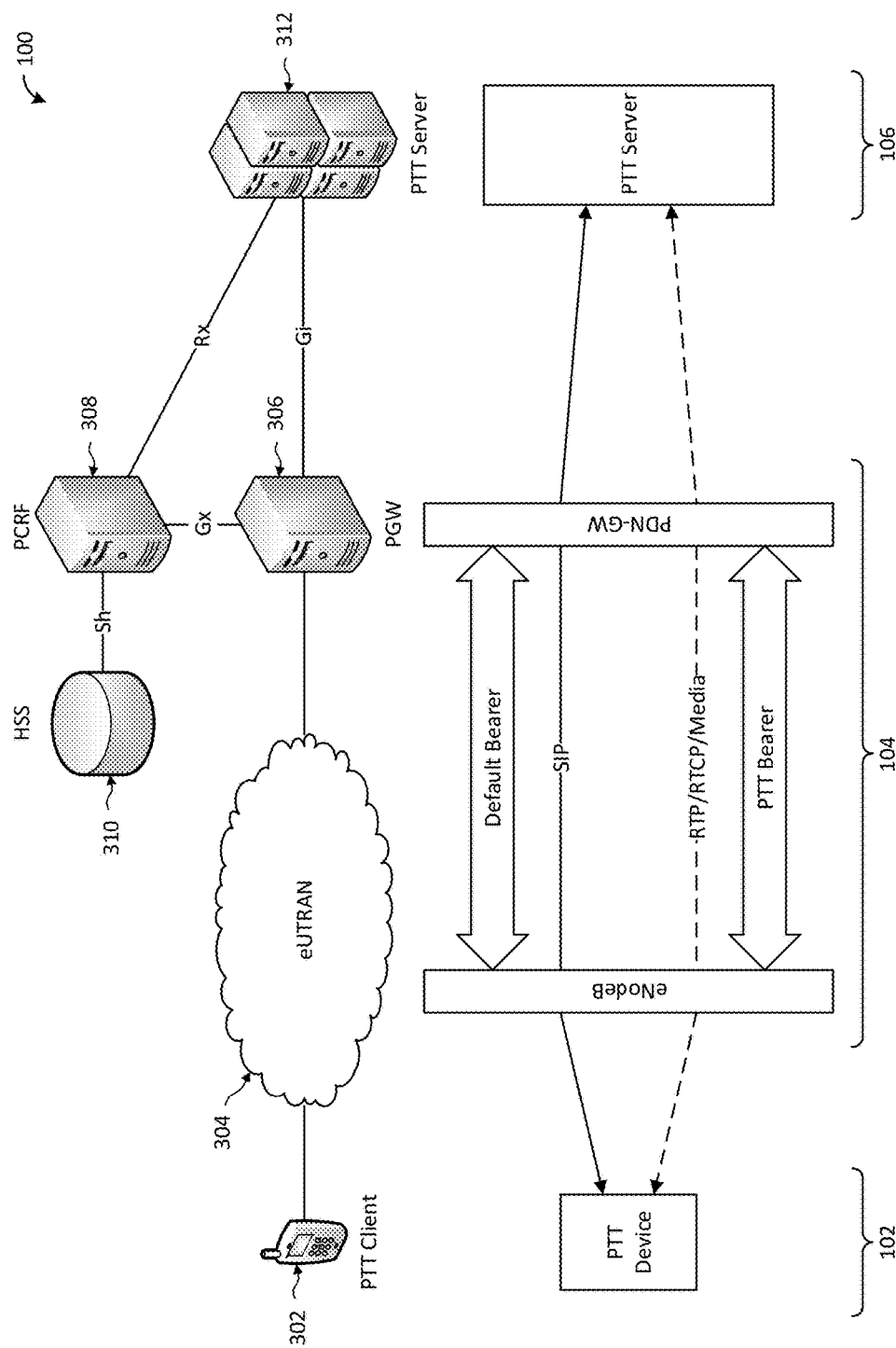
FIG. 3 shows the network architecture of the communications system.

FIG. 3 shows the network architecture of the communications system 100. The embodiment shown in FIG. 3 supports PoC. The client devices 102 include a PTT client 302. The PTT client 302 may be any device capable of running a PTT client.

The communications network 104 includes a core network (CN), such as an evolved packet core (EPC) network, and an eUTRAN 304. The EPC includes a packet data network (PDN) gateway PGW (PGW) 306, a policy and charging rules function (PCRF) 308, and a home subscriber server (HSS) 310. A default bearer and a PTT bearer are established by the communications network 104 between the eUTRAN 304 and the PGW 306. As noted above, the PTT bearer is associated with QoS parameters tuned for PTT traffic. The PTT bearer is RAN-specific. In embodiments where a network has multiple RANs, a PTT bearer may be established between the CN and each RAN.

The telecommunications services platform 106 is a PoC platform and includes a PTT server 312. The PTT server 312 selects a QoS parameters for PTT over LTE. The QoS parameters for PTT over LTE traffic may be set at the time of the PTT call, or at the time the PTT client logs in. The PTT server 312 dynamically establishes a dedicated evolved packet system (EPS) bearer for the PTT bearer by configuring the PCRF 308, and may do so using a standard interface such as the Rx reference point. The PCRF 308 configures the PGW 306 to establish the bearer using a standard interface such as the Gx reference point. During a PTT call, the PCRF 308 may collect information such as billing information and store it in the HSS 310 using a standard interface such as the Sh DIAMETER interface. It should be appreciated that the PGW 306, the PCRF 308, the HSS 310, and the PTT server 312 may also communicate using non-standard interfaces provided by a cellular network operator.

The PTT server 312 may provide the QoS parameters to the core network using several techniques. In some embodiments, a set of QoS parameters is associated with a QoS profile in the core network. There could be one or more such QoS profiles configured in the core network, and stored in a location accessible to the PCFR 308. In such embodiments, the stored QoS profiles may be preconfigured to be optimized for PTT traffic. The PTT server 312 indicates that a specific QoS profile should be used for establishing the dedicated PTT bearer by providing a QCI for the QoS profile to the core network. The core network (e.g., the PCRF 308) then applies the QoS parameters associated with the requested QoS profile to the PTT bearer. In other embodiments, the PTT server 312 may directly provide the QoS parameters to the core network. For example, the PTT server 312 may be located within the PCRF 308, so that the QoS parameters may be directly provided to a policy and charging enforcing function (PCEF) on the PGW 306 when establishing the PTT bearer.

In some embodiments, the PTT bearer is not established by the PTT server 312. For example, in some embodiments, the PTT server 312 may provide the QoS parameters for a dedicated EPS bearer that is statically set by a cellular network operator. Likewise, in some embodiments, the PTT sever 312 may communicate with the cellular network operator's QoS gateway, which may provide the QoS parameters for a dedicated EPS bearer. In such embodiments, the dedicated EPS bearers are used for PTT traffic.

The PTT client 302 and the PTT server 312 initialize a PTT call using a configuration protocol such as session initiation protocol (SIP), real-time transport protocol (RTP), real-time transport control protocol (RTCP), and the like. The configuration protocol is carried over IP. IP packets for the configuration protocol are exchanged between the PTT server 312 and the PGW 306 using an interface to external packet data networks that contains the IP point of presence of the PTT client 302, such as the Gi reference point.

Further in FIG. 3, the PTT server 312 transmits and receives initiation traffic, such as SIP traffic, over the default bearer. Initiation traffic may include functions such as invitations, call setup, and other messages. The PTT server 312 transmits and receives RTP, RTCP, or media traffic during a PTT call over the PTT bearer. In other words, PTT traffic may be split across two bearers: the default bearer for PTT signaling (e.g., SIP traffic), and a dedicated bearer optimized for PTT media (e.g., RTP, RTCP, and media traffic).

In some embodiments (not shown in FIG. 3), initiation traffic, such as SIP traffic, may be carried over a dedicated bearer that is established and used for initiation. The dedicated bearers for initiation traffic may sometimes be referred to herein as "initiation bearers." The initiation bearer is optimized for PTT signaling characteristics, in a manner similar to the PTT bearer, which is optimized for PTT media traffic. In other words, PTT traffic may be split across two dedicated bearers: a first dedicated bearer optimized for PTT signaling (e.g., SIP traffic), and a second dedicated bearer optimized for PTT media (e.g., RTP, RTCP, and media traffic).

An eNB in the eUTRAN 304 matches traffic to a traffic flow template (TFT) configured in the eNB. The TFT is configured using the QoS parameters for PTT over LTE, which was specified by the PTT server 312. For example, the TFT configured on the eNB may be optimized for PTT with a QoS parameters specifying a PDB that is optimized for PTT.

Figure 4:
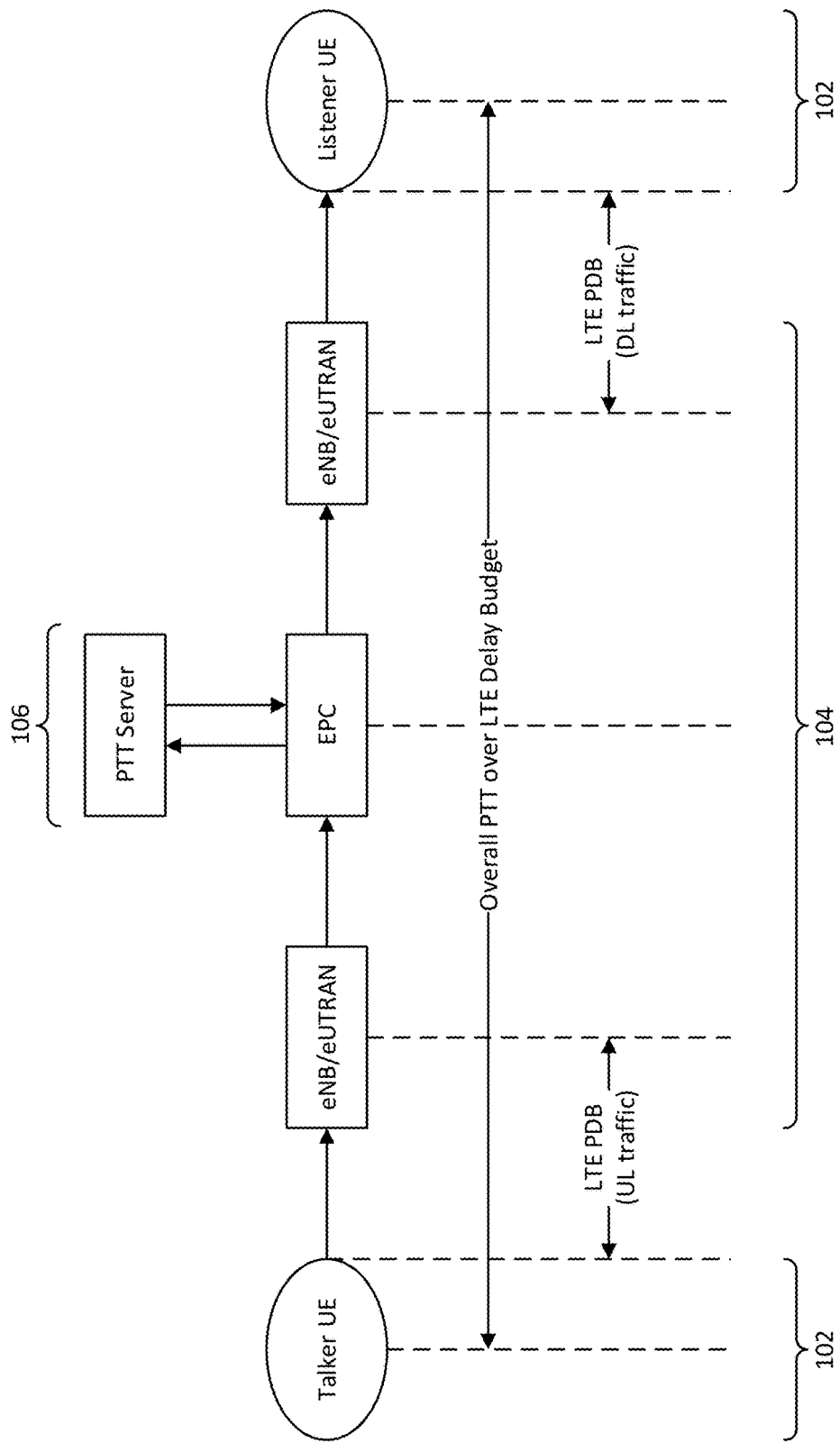
FIG. 4 is a diagram of a delay budget for PTT.

FIG. 4 is a diagram of a delay budget for PTT. As shown, the overall PTT over LTE delay budget (sometimes called the "mouth-to-ear-delay") is defined between a talker UE and a listener UE. An LTE packet delay budget must be considered for both uplink traffic (e.g., talker UE to eNB) and downlink traffic (e.g., eNB to listener UE).

The LTE PDB is the difference between the overall delay budget for PTT over LTE, and all other delay budgets (except the LTE PDB itself). For example, consider a system where an overall PTT over LTE delay budget of 400 ms is desired. In such an example system, there may be a 25 ms delay for recording media, a 60 ms delay for packetization/de-jittering, a 25 ms delay for playing media, a 30 ms round trip time (RTT) between the eUTRAN and the PTT Server, and 10 ms of processing time at the PTT server, for a total delay of 150 ms. With a total delay budget of 400 ms, this leaves an LTE PDB of about 250 ms.

In some embodiments, the LTE PDB is increased to a value higher than is used in some example LTE or VoIP traffic. In a particular embodiment, the PDB for PTT over LTE is greater than or equal to about 100 ms. Such an increased delay may allow for multiple HARQ retransmissions. Packet loss may thus be reduced if there are errors in the first few transmissions. Any sacrifices in performance may be tolerable in a PTT system. In another particular embodiment, the PDB for PTT over LTE is greater than or equal to about 40 ms. Continuing the above example, if the LTE PDB is set to only 40 ms (e.g., similar to a VoLTE packet) then the packet may need to be discarded if the received packet encounters errors after two or three HARQ retransmissions. This may force the LTE scheduler to allocate a more conservative coding scheme, such that packets are delivered error-free within fewer transmissions. More conservative coding may correlate to a higher forward correction built into a packet, and thus higher data overhead may be incurred for data transmission over an LTE RAN. In other words, increasing the LTE PDB may cause the scheduler to select a lower transmission block size (TBS) index. As discussed in the 3GPP TS 36.213 standard (e.g., Table 7.1.7.2.1-1), a lower TBS index may correlate to a lower data throughput. Selection of the TBS index may also consider other factors, such as LTE radio conditions of the RAN. Decreasing the LTE PDB may cause a desired number of HARQ retransmissions, such as about two, to be used. Increasing the LTE PDB to a value greater than about 200 ms may cause the RAN to select a more liberal MCS/TBS allocation scheme, e.g., a higher MCS index and a higher TBS index.

By adjusting the PDB to be a higher PDB, the LTE RAN may configure itself to use a less aggressive coding scheme, thus providing a better opportunity to utilize available spectrum and radio resources optimally. Use of less aggressive packet retry schemes may allow the RAN to improve the reliability of PTT over LTE, and may help in recovering from errors at various layers during PTT over LTE. Increasing the PDB may cause the RAN to select a QCI more suitable for PTT over LTE, such as QCI. For example, the use of non-GBR QCI 8 may result in a very low packet loss with a 300 ms PDB, or the use of non-GBR QCI 7 may result in a lower packet loss with a 100 ms PDB. Both of these QoS configuration may yield acceptable performance and improved reliability. Use of a higher PDB may allow the RAN to select a higher TBS index, which may result in a higher total quantity of PTT user data per LTE physical resource block (PRB), notwithstanding increased error rates that may be caused by the higher TBS index.

Figure 5:
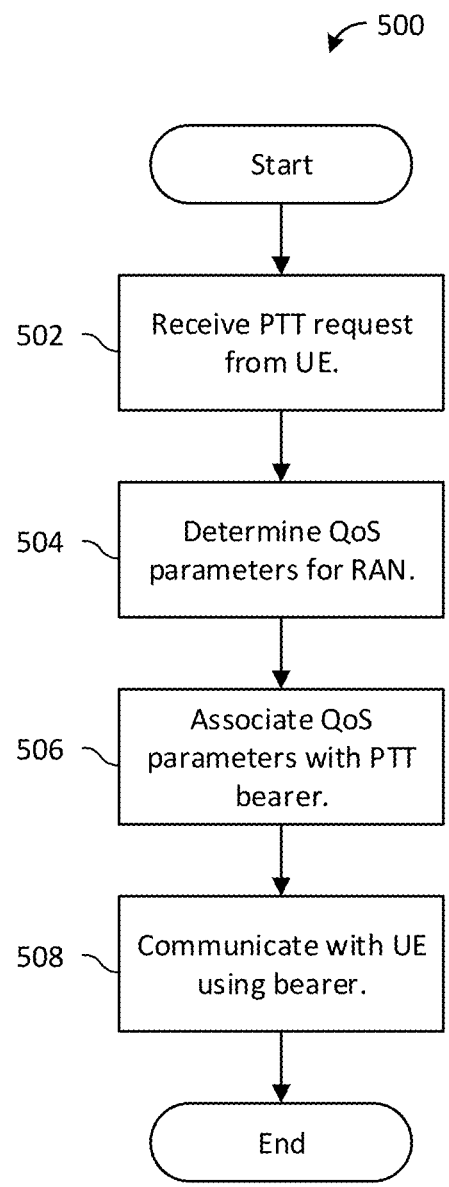
FIG. 5 is a flow diagram of a RAN configuration method.

FIG. 5 is a flow diagram of a RAN configuration method 500. The RAN configuration method 500 may be performed by a telecommunications services platform, such as the PTT server 312.

The PTT server receives a request from a UE to access the PTT server (step 502). The request may be received over a standard LTE bearer. QoS parameters for a RAN the UE is connected to are determined (step 504). The QoS parameters are determined by the PTT server. The PTT server associates the QoS parameters with a bearer that will be used for PTT traffic (step 506). The bearer may be established in response to a request by the PTT server, or may be a static bearer in the network. The QoS parameters may specify RAN configuration parameters, such as a PBD. The PTT server communicates with the UE according to the PTT bearer configured by the PTT server (step 508).

Figure 6:
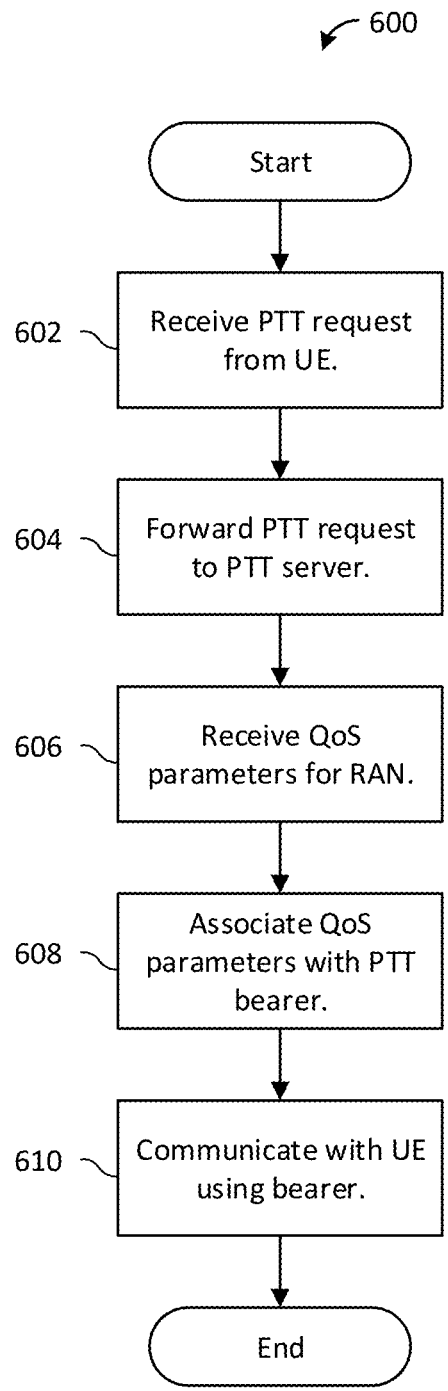
FIG. 6 is a flow diagram of a RAN configuration method.

FIG. 6 is a flow diagram of a RAN configuration method 600. The RAN configuration method 600 may be performed by a device in a telecommunications core network, such as the PGW 306.

The PGW receives a request from a UE to access a PTT server (step 602). The request may be received over a standard LTE bearer. The PGW forwards the request to a PTT server (step 604). The PTT server may be a server in the core network, or a server outside of the core network. For example, the PTT server may be located on the premises of a PTT service provider, or may be hosted in the cloud. QoS parameters for a RAN the UE is connected to are received by the PGW (step 606). The QoS parameters are determined by the PTT server. The QoS parameters may be directly sent to the PGW, or may be configured on another component in the core network such as the PCRF 308 by associating set of QoS parameters with a QoS profile. The PGW associates the QoS parameters with a bearer that will be used for PTT traffic (step 608). The bearer may be established by the PGW in response to a request by the PTT server, or may be a static bearer in the network. The QoS parameters may specify RAN configuration parameters, such as a PBD. The PGW communicates with the UE according to the configured PTT bearer (step 610). For example, the PGW may route traffic from the RAN to the PTT server.

Figure 7:
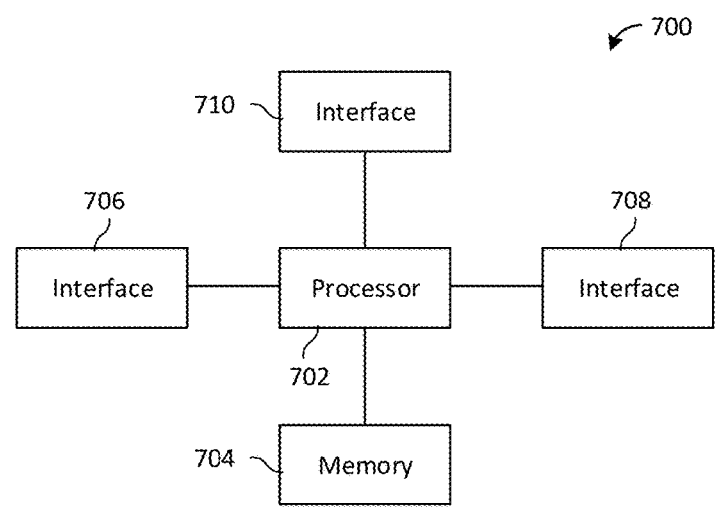
FIG. 7 is a block diagram of an embodiment processing system.

FIG. 7 is a block diagram of an embodiment processing system 700 for performing methods described herein, which may be installed in a host device. As shown, the processing system 700 includes a processor 702, a memory 704, and interfaces 706-710, which may (or may not) be arranged as shown in FIG. 7. The processor 702 may be any component or collection of components adapted to perform computations and/or other processing related tasks, and the memory 704 may be any component or collection of components adapted to store programming and/or instructions for execution by the processor 702. In an embodiment, the memory 704 includes a non-transitory computer readable medium. The interfaces 706, 708, 710 may be any component or collection of components that allow the processing system 700 to communicate with other devices/components and/or a user. For example, one or more of the interfaces 706, 708, 710 may be adapted to communicate data, control, or management messages from the processor 702 to applications installed on the host device and/or a remote device. As another example, one or more of the interfaces 706, 708, 710 may be adapted to allow a user or user device (e.g., personal computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
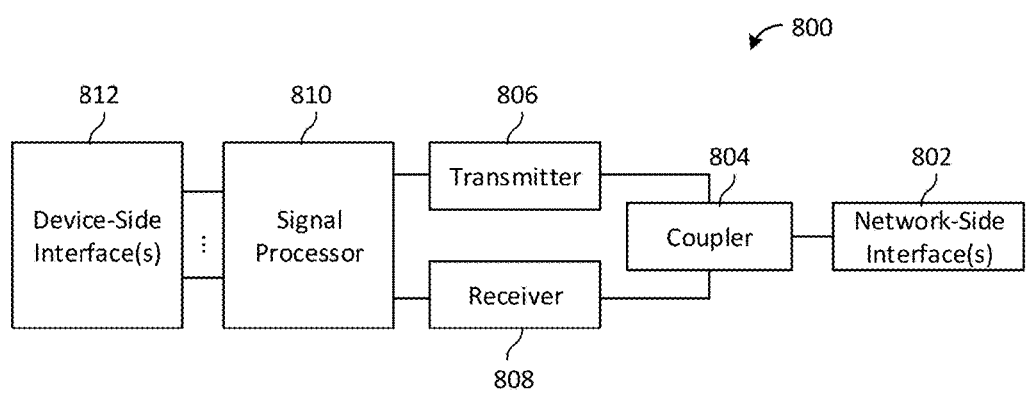
FIG. 8 is a block diagram of a transceiver.

In some embodiments, one or more of the interfaces 706, 708, 710 connects the processing system 700 to a transceiver adapted to transmit and receive signaling over the telecommunications network. FIG. 8 is a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a receiving unit/module, a determining unit/module, an associating unit/module, a communicating unit/module, an establishing unit/module, an indicating unit/module, a transmitting unit/module, and/or a forwarding unit/module. The respective units/modules may be hardware, software, or a combination thereof. For instance, one or more of the units/modules may be an integrated circuit, such as field programmable gate arrays (FPGAs) or application-specific integrated circuits (ASICs).

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   receiving, by a push-to-talk (PTI) server in a core network (CN), a request from a user equipment (UE) to initiate a PTI call, the UE connected to a radio access network (RAN);
   accessing, by the PTI server, a first bearer defining data flow between the CN and the RAN, the first bearer associated with first quality of service (QoS) parameters, the first bearer existing prior to receiving the request from the UE to access the PTI server;
   communicating, by the PTI server, initiation traffic for the PTI call with the UE according to the first bearer;
   establishing, by the PTI server, a second bearer defining data flow between the CN and the RAN, the second bearer being different from the first bearer;

determining, by the PTI server, second QoS parameters for the second bearer, the second QoS parameters being different from the first QoS parameters, wherein the second QoS parameters include at least one of a physical layer parameter, a media access control layer parameter, a radio link control layer parameter, and a packet data convergence protocol layer parameter for the RAN; associating, by the PTI server, the second QoS parameters with the second bearer; and communicating, by the PTI server, media traffic for the PTI call with the UE according to the second bearer.

2. The method of claim 1, wherein the associating the second QoS parameters with the second bearer comprises:
indicating, by the PTI server, a QoS profile associated with the second QoS parameters to a policy and charging rules function (PCRF) in the CN.

3. The method of claim 1, wherein the associating the second QoS parameters with the second bearer comprises:
indicating, by the PTT server, the second QoS parameters to a policy and charging enforcing function (PCEF) in the CN.

4. The method of claim 1, wherein the physical layer parameter indicates the RAN should use transmission time interval (TTI) bundling.

5. The method of claim 1, wherein the media access control layer parameter indicates the RAN should use semi-persistent scheduling (SPS).

6. The method of claim 1, wherein the media access control layer parameter indicates the RAN should use a packet delay budget (PDB) of at least 40 ms, the PDB indicating the RAN should use two hybrid automatic repeat request (HARD) retries.

7. The method of claim 1, wherein the media access control layer parameter indicates the RAN should use a packet delay budget (PDB) of at least 200 ms, the PDB indicating the RAN should increase a modulation and coding scheme (MCS) index or a transmission block size (TBS) index of the RAN.

8. The method of claim 1, wherein the radio link control layer parameter indicates the RAN should operate in acknowledged mode (AM).

9. The method of claim 8, wherein communicating with the UE comprises: transmitting, by the PTT server, IP packets to the UE, each of the IP packets including more than one media frame of PTT data.

10. The method of claim 1, wherein the packet data convergence protocol layer parameter indicates the RAN should use robust header compression (RoHC).

11. The method of claim 1, wherein the second QoS parameters indicate a packet delay budget for the second bearer between the RAN and the CN.

12. The method of claim 1, wherein the second QoS parameters are determined by the PTT server such that the RAN has a media access control (MAC) layer error rate of 1% over the second bearer.

13. A method comprising:
receiving, by a gateway in a core network (CN), a request from a user equipment (UE) to initiate a PTT call, the UE connected to a radio access network (RAN);
forwarding, by the gateway, the request from the UE to a PTT server in the CN;
communicating, by the gateway, initiation traffic for the PTT call between the UE and the PTT server according to a first bearer, the first bearer defining data flow between the CN and the RAN, the first bearer associated with first quality of service (QoS) parameters, the first bearer existing prior to receiving the request from the UE to access the PTT server;
receiving, by the gateway, a request from the PTT server to associate second QoS parameters with a second bearer, the second bearer defining data flow between the CN and the RAN, the second bearer being different from the first bearer;
associating, by the gateway, the second bearer with the second QoS parameters; and
communicating, by the gateway, media traffic for the PTT call between the UE and the PTT server according to the second bearer.

14. The method of claim 13, further comprising:
receiving, by the gateway, a request to establish the second bearer from a policy and charging rules function (PCRF) in the CN, the request indicating the second QoS parameters; and
establishing, by the gateway, the second bearer between the RAN and the CN according to the request to establish the second bearer.

15. The method of claim 13, wherein the second QoS parameters include at least one of a physical layer parameter, a media access control layer parameter, a radio link control layer parameter, and a packet data convergence protocol layer parameter for the RAN.

16. The method of claim 15, wherein the physical layer parameter indicates the RAN should use transmission time interval (TTI) bundling.

17. The method of claim 15, wherein the media access control layer parameter indicates the RAN should use semi-persistent scheduling (SPS).

18. The method of claim 15, wherein the media access control layer parameter indicates the RAN should use a packet delay budget (PDB) of at least 40 ms, the PDB indicating the RAN should use two hybrid automatic repeat request (HARQ) retries.

19. The method of claim 15, wherein the media access control layer parameter indicates the RAN should use a packet delay budget (PDB) of at least 200 ms, the PDB indicating the RAN should increase a modulation and coding scheme (MCS) index or a transmission block size (TBS) index of the RAN.

20. The method of claim 15, wherein the radio link control layer parameter indicates the RAN should operate in acknowledged mode (AM).

21. The method of claim 15, wherein communicating with the UE comprises:
forwarding, by the gateway, IP packets from the PTT server to the UE, each of the IP packets including more than one media frame of PTT data.

22. The method of claim 15, wherein the packet data convergence protocol layer parameter indicates the RAN should use robust header compression (RoHC).

23. The method of claim 13, wherein the second QoS parameters indicate a packet delay budget for the second bearer between the RAN and the gateway.

24. A push-to-talk (PTT) server comprising:
one or more processors; and
a computer readable storage medium storing programming for execution by the one or more processors, the programming including instructions to:
receive a request from a user equipment (UE) to initiate a PTT call, the UE connected to a radio access network (RAN), the PTT server being in a core network (CN);
access a first bearer defining data flow between the CN and the RAN, the first bearer associated with first quality of service (QoS) parameters, the first bearer existing prior to receiving the request from the UE to access the PTT server;
communicate initiation traffic for the PTT call with the UE according to the first bearer;
establish a second bearer defining data flow between the CN and the RAN, the second bearer being different from the first bearer;
determine second QoS parameters for the second bearer, the second QoS parameters being different from the first QoS parameters;
associate the second QoS parameters with the second bearer; and
communicate media traffic for the PTT call with the UE according to the second bearer.

* * * * *